Figure 7:
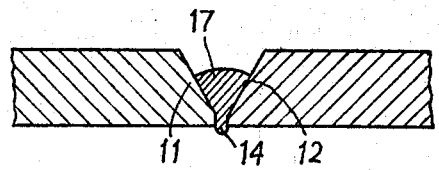

United States Patent [19]

Kasper

[11] 4,175,227

[45] Nov. 20, 1979

[54] PROCESS FOR AUTOMATICALLY VERTICALLY BUTT WELDING STEEL SHEET MATERIAL FOR CONTAINERS

[75] Inventor: Erich Kasper, Weisskirchen, Austria

[73] Assignee: Vereinigte Osterreichische Eisen- und Stahlwerke-Alpine Montan Aktiengesellschaft, Vienna, Austria

[21] Appl. No.: 862,520

[22] Filed: Dec. 20, 1977

[30] Foreign Application Priority Data

Dec. 21, 1976 [AT] Austria ............................... 9498/76

[51] Int. Cl.² .............................................. B23K 9/12
[52] U.S. Cl. ................................ 219/125.12; 219/74; 219/146.23
[58] Field of Search ............... 219/74, 137 R, 125.12, 219/146.23, 105, 126

[56] References Cited

U.S. PATENT DOCUMENTS

| 1,812,123 | 6/1931 | Stresau | 219/137 R |
| 2,258,913 | 10/1941 | Stone | 219/137 R X |
| 3,139,506 | 6/1964 | Wolff | 219/74 |
| 3,328,556 | 6/1967 | Nelson | 219/137 R |
| 3,597,583 | 8/1971 | Hulsewig | 219/146.23 |
| 3,825,712 | 7/1974 | Gibbs | 219/137 R |
| 3,845,271 | 10/1974 | Hirano | 219/125.12 |

OTHER PUBLICATIONS

Welding Handbook—Sixth Ed., Section 5, AW, Miami, 1973, p. 86.7.

*Primary Examiner*—E. A. Goldberg
*Attorney, Agent, or Firm*—Cushman, Darby & Cushman

[57] ABSTRACT

Chemically resistant steels for containers are butt welded by using an automatic welding process. The electrode is oscillated over the whole width of the seam and is kept to a maximum thickness of 1 mm.

14 Claims, 13 Drawing Figures

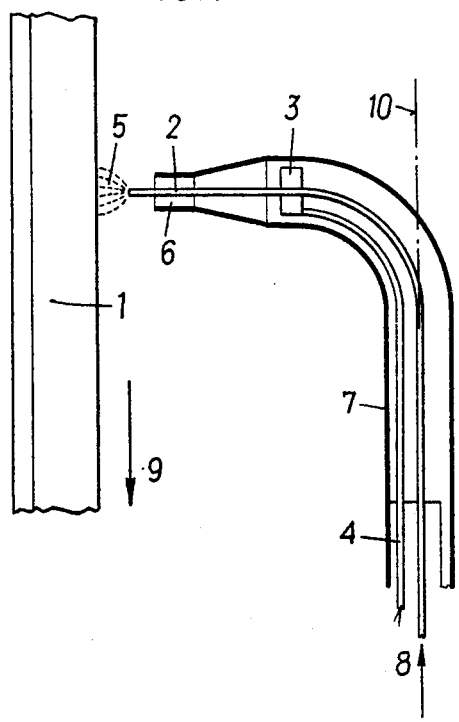
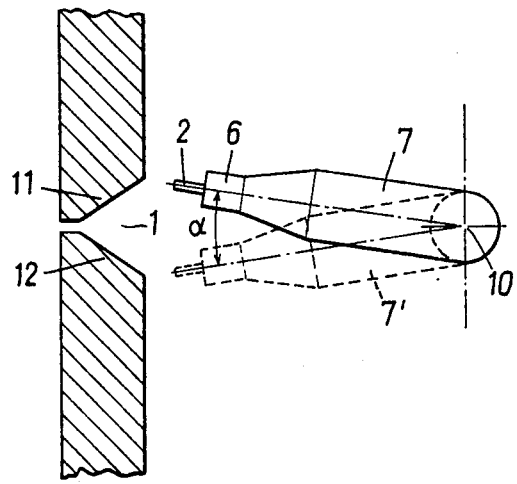
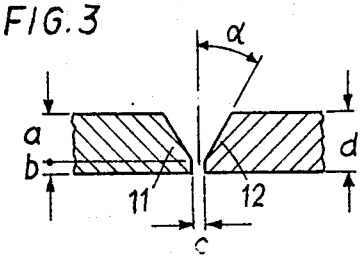
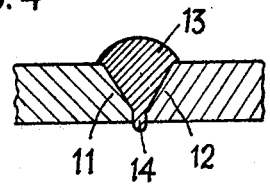
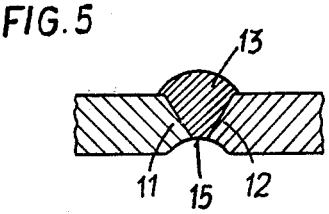
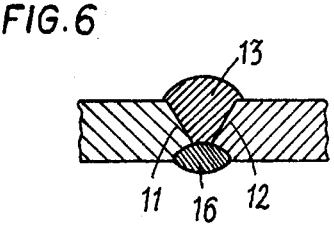

PROCESS FOR AUTOMATICALLY VERTICALLY BUTT WELDING STEEL SHEET MATERIAL FOR CONTAINERS

The present invention refers to a process for butt welding of vertical butt joints of sheet material, particularly for welding of vertical butt joints of large capacity containers, consisting of rust-proof and chemically resistant steel containing more than 2 percent by weight Ni with or without special additives such as Nb, Ti and Mo by means of an electrode formed of a welding wire.

Vertical butt joints of large capacity containers consisting of non-alloyed or low-allow steel are presently exclusively welded by means of automatic welding apparatuses in an atmosphere of protective gas, thereby operating with sheets having a thickness up to approximately 12 mm according to the MAG-welding process and with sheets of greater thickness according to the electrogas process. In both cases, the sheets to be connected by welding are being arranged with their edges in close proximity and thereby keeping free a gap. When operating according to the MAG-process, the air gap, being provided with a bevel of 60° is being filled in upward direction and in two subsequent operations from both sides with welding material thereby using an oscillating wire electrode. When operating according to the electrogap welding process the air gap is being filled with welding material in upward direction between copper plates. In both cases, the automatic welding apparatus is moved in upward direction in dependence on the progress of the welding operation. In view of the walls of such large capacity containers being formed of sheets having a great thickness, welding electrodes of relatively great diameter were used.

For many purposes it is required to construct the container walls of stainless steel and chemically resistant steel, respectively, and with such alloyed steels it was up till now impossible to work with automatic welding apparatuses in a satisfactory manner. This is attributed to the low heat conductivity of such alloyed sheets having as a result a low solidification speed of the molten bath of welding material so that the molten bath of the welding material tends to flow out of the weld seam. For this reason it was up till now necessary to manually produce the weld seams in containers consisting of stainless steel and chemically resistant steel, respectively. This did require a great skill of the welder and the quality of the weld seam was dependent on the skill of the welder.

The present invention now aims at avoiding the mentioned drawbacks encountered in a process for vertically butt welding of sheets, particularly vertical butt joints of large capacity containers, of rust-proof and chemically resistant steels containing more than 2 percent by weight Ni by means of an electrode formed of a welding wire, noting that the sheet edges to be welded are, preferably for a dihedral angle of 60°, being bevelled and the invention essentially consists in that the sheet edges are being bevelled on one side only and the welding operation is being performed at the open side of the butt joint by means of an electrode having a maximum wire thickness of 1 mm, in that the electrode is in a manner known per se given an oscillating movement, in that the oscillating movement is being effected in transverse direction to the weld seam over its whole width and with a frequency of 70 to 140 double-strokes per minute, in that the feed motion in direction of the weld seam is being effected in a manner known per se in downward direction and in that the welding area is kept under an active gas atmosphere containing $CO_2$, $O_2$ and for the major part Ar, noting that the feed motion of the welding wire, the oscillating movement thereof and the feed motion of the welding apparatus in direction of the welding seam is being automatically controlled. In the process according to the invention the electrode used is preferably an electrode having a wire thickness of 0.8 mm. The oscillating movement of the electrode preferably has a frequency of 90 to 120 double-strokes per minute. By using an electrode of very small wire thickness and by giving this electrode an oscillating movement over the whole width of the welding seam, only very small amounts of welding material are being applied which rapidly solidify. By bevelling the sheet edges and by performing the welding operation on the open side of the butt joint formed by the bevelled edges, rapid solidification of the applied welding material is further enhanced. By performing the welding operation in vertical butt joints in downward direction there results the advantage that each subsequent weld bead is being applied on the lower side of the previously applied weld bead just becoming solidified and a good cohesion of the weld beads is warranted. By the rapid frequency of the oscillating movement of the welding electrode, the solidification speed of the thin weld beads is taken into account. By this measure and by using an active mixed gas atmosphere mainly containing argon, the resistance of the weld seam against inter-crystalline corrosion can obviously be enhanced and nitrogen can be prevented from becoming dissolved in the welding material and the formation of carbides within the weld seam can be avoided. In this connection, it is convenient to use an electrode having the composition of a stainless steel and additionally containing niobium for increasing the corrosion resistance. It has been found that when using these measures the welding operation can be automatically performed thereby automatically controlling by means of an automatic welding apparatus the feed motion of the welding wire and its oscillating movement and the feed motion in direction of the weld seam of the welding apparatus as a whole.

According to a preferred embodiment of the process according to the invention the welding process is performed such that a gap is kept free between the edges of the sheets to be mutually connected by welding and in that, after having finished the welding operation at the open side of the butt joint, a counter-weld is being performed in analogous manner at the other side of the butt joint. By applying such a counter-weld, the weld seam is being completely closed at the opposed side. According to a preferred embodiment, the butt joint is, prior to applying the counter-weld, being subjected to a grinding operation on that side on which the counter-weld is to be applied, so that an unobjectionable cohesion of the counter-weld with the welding material applied at the other side and with the sheet edges is warranted.

Up to a certain sheet thickness, the welding operation can be effected at the open side of the bevelled butt joint in one layer only. With sheets of greater thickness the welding operation is, according to the invention, effected in a plurality of layers at the open side of the butt joint, noting that each subsequent layer is applied in an equal manner as is applied the first layer. This kind of operation prevents the welding material applied to assume a thickness resulting in too low a solidification rate because each subsequent layer is only applied when the previously applied layer has completely become solidified. In this case, the middle portion (bulge) is preferably being rounded by a grinding operation, so that the welding operation can be performed in an unobjectionable manner at the edge portions of the weld seam. According to the invention, the welding operation at the open side of the butt joint can be effected in one layer with sheets having a thickness up to about 4 mm, in two layers with sheets having a thickness about 4 to 7 mm and in three or more layers with sheets having a thickness of more than 7 mm.

It has proved advantageous to use as an active gas a gas mixture containing 84 percent by volume argon, 13 percent by volume $CO_2$ and 3 percent by volume $O_2$. The electrode used in the process according to the invention, preferably is a welding wire containing approximately 0.05 percent by weight C, 18.0 to 20.0 percent by weight Cr, 9.5 to 12.0 percent by weight Ni and up to 2.5 percent by weight Mo as well as traces of Nb and the remainder iron and usual contaminations.

The invention provides the possibility to automatically weld vertical butt joints of sheets consisting of stainless and chemically resistant steels containing more than 2 percent by weigtht Ni and additives, if any, for example steels having a composition as shown in the following table and containing as the remainder iron and usual contaminations.

Table:

| C | Si | Mn | P | S | Cr | Mo | Ni | Nb | Ti |
|---|---|---|---|---|---|---|---|---|---|
| ≦0.07 | ≦1.0 | ≦2.0 | 0.045 | 0.030 | 17/20 | | 8.5/10 | | |
| ≦0.12 | ≦1.0 | ≦2.0 | 0.045 | 0.030 | 17/19 | | 8/10 | | |
| 0.07 | 1.0 | 2.0 | 0.045 | 0.030 | 17/20 | 0.20 | 9/11.5 | 10 × % C | |
| 0.10 | 1.0 | 2.0 | 0.045 | 0.030 | 17/19 | | 9/11.5 | 8 × % C | |
| 0.10 | 1.0 | 2.0 | 0.045 | 0.030 | 17/19 | | 9/11.5 | | 5 × % C |
| 0.03 | 1.0 | 2.0 | 0.045 | 0.030 | 17/20 | | 10/12.5 | | |
| 0.10 | 1.0 | 2.0 | 0.045 | 0.030 | 16.15/18.5 | 2/2.5 | 10.5/13.5 | 8 × % C | |
| 0.10 | 1.0 | 2.0 | 0.045 | 0.030 | 16.5/18.5 | 2/2.5 | 10.5/13.5 | | 5 × % C |
| 0.10 | 1.0 | 2.0 | 0.045 | 0.030 | 16.5/18.5 | 2.5/3.0 | 12.0/14.5 | 8 × % C | |
| 0.10 | 1.0 | 2.0 | 0.045 | 0.030 | 16.5/11.5 | 2.5/3.0 | 12.0/14.5 | | 5 × % C |

The process according to the invention is further illustrated with reference to the annexed drawing.

Figure 10:
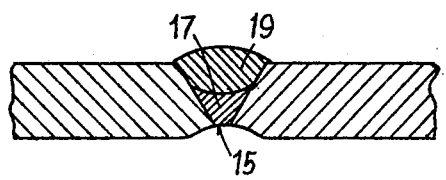
Figure 11:
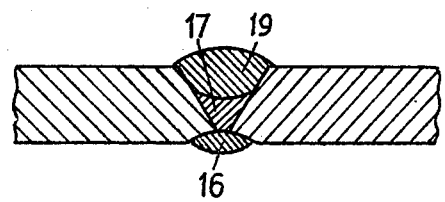
Figure 12:
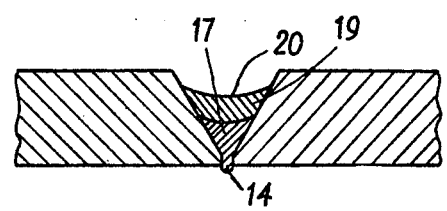
Figure 13:
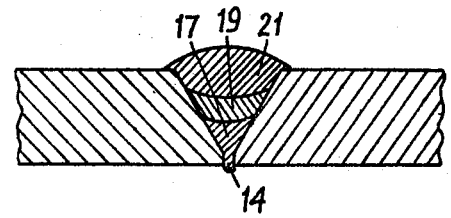

In the drawing,

FIGS. 1 and 2 show an apparatus for performing the welding operation according to the inventive process, FIG. 3 illustrates the preparation of a vertical butt joint of the sheets used for constructing a container, FIGS. 4 to 6 illustrate the various process steps when welding sheets having a thickness up to 4 mm, FIGS. 7 to 11 illustrate the various process steps when welding sheets having a thickness of about 4 to 7 mm, and FIGS. 12 and 13 illustrate the process steps when welding sheets having a thickness of more than 7 mm.

In FIGS. 1 and 2, 1 is a vertical butt joint of the sheets to be connected by welding, 2 is the electrode having a wire thickness of 0.8 mm. 3 is the connection for supplying the welding current via a cable 4. 5 is the welding arc. A protective gas is supplied by means of a nozzle 6. The protective gas is being fed to the nozzle 6 by means of a tube 7 surrounding the electrode. The arrow 8 is indicating the feed direction of the electrode and the arrow 9 indicates the working direction of the welding operation, i.e. falling and thus in downward direction. The tube 7, which surrounds the electrode 2, is oscillating around the axis 10 with an oscillating frequency of 90 to 120 double-strokes per minute, the oscillating angle being indicated with α. The one end position of the tube 6 is shown in full lines and given the reference numeral 7, whereas the other end position is shown in dashed lines and given the reference numeral 7'. In this manner, the butt joint 1 is being welded over its whole width between the sheet edges 11 and 12.

FIG. 3 illustrates the preparation of the vertically extending sheet edges 11 and 12 of sheets used for constructing a container. The sheet edges 11 and 12 are bevelled over a portion a of its thickness for an angle of 30°. In the portion b the sheet edges are not bevelled and a gap c of about 1 mm is kept free between both sheet edges 11 and 12. The whole sheet thickness has the value d.

FIG. 4 now illustrates the welding operation for sheets having a sheet thickness d up to 4 mm. In this case, the open side of the gap is being filled with welding material 13. At the other side of the sheets, the welding material flows out in an uncontrolled manner at 14. For this reason, the weld seam is subjected at the other side of the sheet, i.e. at 15, to a grinding operation resulting in a cross-section as shown in FIG. 5. Subsequently and in a further operation step, the groove produced is filled by a counter-weld 16 as is shown in FIG. 6.

Figure 8:
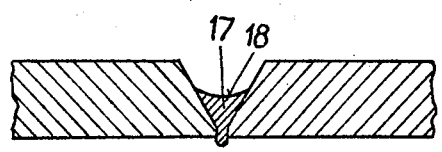
Figure 9:
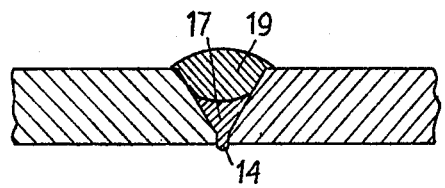

FIGS. 7 to 11 illustrate the welding operation for sheets having a thickness of about 4 to 10 mm. In this case, the open gap is, as illustrated by FIG. 7, as was the case with FIG. 4, partially filled with welding material 17. In view of the thickness of the sheet being greater, the weld seam does not fill the gap over the whole depth. In the following operation step, the center portion 18 of the weld seam is rounded by a grinding operation as is illustrated by FIG. 8. Subsequently and in a further operation step, a further welding layer 19 is applied as is illustrated by FIG. 9. The welding material 14 which had flown out at the opposed side of the butt joint is in the next process step removed by grinding as is illustrated by FIG. 10, thereby resulting in a similar cross-section as shown in FIG. 5. Subsequently, and in a further operation step, a counter-weld 16 is applied as illustrated by FIG. 11 and in the same manner as illustrated by FIG. 6.

With greater sheet thicknesses, for example thicknesses of more than 7 mm, the operation is as illustrated by FIGS. 12 and 13. As shown in FIG. 12 a further weld layer 19 is being applied to the weld layer 17 after having removed by grinding the middle portion of the welding layer 17 as is illustrated in FIG. 8. The middle portion 20 of the welding layer 19 again is subjected to a grinding operation in similar manner as is illustrated by FIG. 8, whereupon a third welding layer 21 is applied as is illustrated by FIG. 13. The welding material 14 having flown out at the opposed side is, as has been illustrated in FIG. 10, removed by a grinding operation, whereupon a counter-weld is applied as is illustrated by FIG. 11.

When welding sheets of still greater thickness a correspondingly greater number of welding layers may be applied.

I claim:

1. An automatic process for butt welding a vertical seam along a vertical butt joint between sheets of rustproof and chemically resistant steels containing more than 2 percent by weight Ni, in which method the feed motion of a welding wire toward the weld seam, an oscillating movement of the welding wire transverse to the weld seam and the movement of the welding wire along the weld seam are automatically controlled and in which method the edges of the sheets are bevelled on one side only so as to form an open side of the butt joint, said method comprising performing the welding operation along the open side of the butt joint by providing an electrode having a maximum wire thickness of 1 mm, by oscillating the electrode over the whole width of the weld seam with a frequency of 70 to 140 double strokes per minute, by moving the electrode downwardly along the vertical weld seam and by keeping the welding area under a reactive gas atmosphere which contains carbon dioxide, oxygen and a major proportion of argon.

2. A process as in claim 1 wherein the electrode has a wire thickness of 0.8 mm.

3. A process as in claim 1 wherein the electrode oscillates at a frequency of 90 to 120 double-strokes per minute.

4. A process as in claim 1 wherein the composition of the electrode is stainless steel containing niobium for increasing the corrosion resistance.

5. A process as in claim 1 wherein a gap is maintained between the edges of the sheets which are to be welded and wherein, after the open side of the butt joint has been welded, a counter-weld is applied in an analogous manner along the other side of the butt joint.

6. A process as in claim 5 wherein, prior to applying said counter-weld, the side of the butt joint to be counter-welded is subjected to a grinding operation.

7. A process as in claim 6 wherein the grinding operation forms a groove in the sheets which is filled subsequently by the counter-weld.

8. A process as in claim 1 wherein the weld seam is effected by welding a plurality of layers in sequence, each subsequent layer being welded in the same manner as the previous layer.

9. A process as in claim 6 wherein one layer is ground to a concave contour before the next layer is applied.

10. A process as in claim 1 wherein the sheets have a thickness up to about 4 mm and wherein the weld seam is formed by welding a single layer.

11. A process as in claim 1 wherein the sheets have a thickness in the range about 4 mm to 7 mm and wherein the weld seam is formed by welding two layers in sequence.

12. A process as in claim 1 wherein the sheets have a thickness greater than about 7 mm and wherein the weld seam is formed by welding at least three layers in sequence.

13. A process as in claim 1 wherein the gas atmosphere is a gas mixture containing 84 percent by volume argon, 13 percent by volume carbon dioxide and 3 percent by volume oxygen.

14. A process as in claim 1 wherein the composition of the electrode is 18–20 percent by weight Cr, 9.5–12 percent by weight Ni, up to 2.5 percent by weight Mo, about 0.05 percent by weight C and traces of Nb, remainder Fe and usual impurities.

* * * * *